Dec. 27, 1938.                F. KÖNIG                2,141,869
PERFORATION OF INSULATING SUBSTANCES BY SPARK DISCHARGES
Filed April 5, 1937
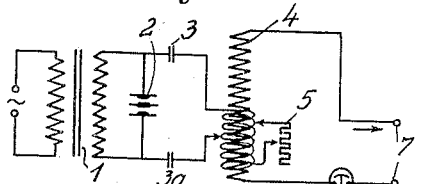
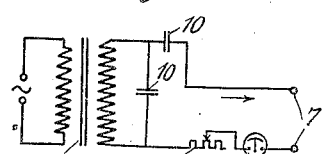
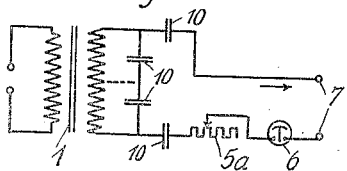
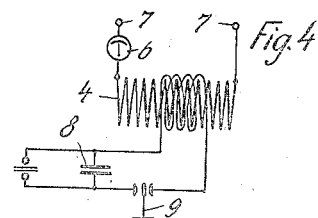
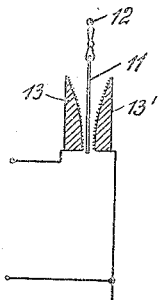
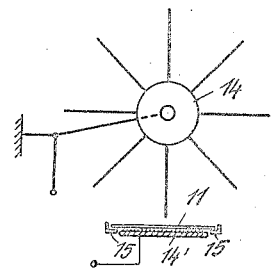
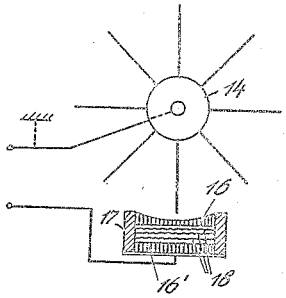
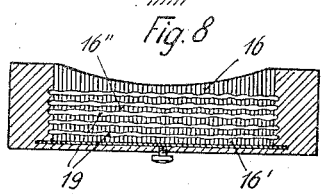
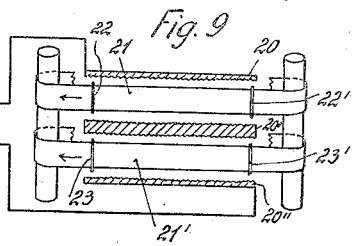
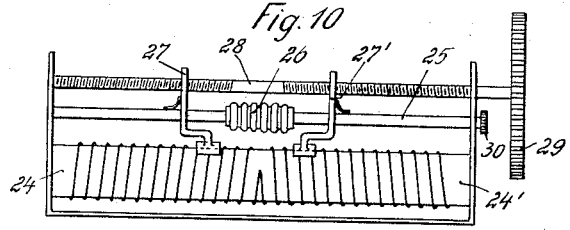
Inventor:
FRITZ KÖNIG
by Kurt H. Feist
his Attorney Patented Dec. 27, 1938

2,141,869

UNITED STATES PATENT OFFICE 2,141,869

PERFORATION OF INSULATING SUBSTANCES BY SPARK DISCHARGES

Fritz König, Soest, Germany

Application April 5, 1937, Serial No. 135,114
In Germany April 4, 1935

9 Claims. (Cl. 175—265)

The invention relates to a process and apparatus for perforating non-conductive substances, more particularly sheet material by spark discharges.

The object of my novel process is to produce in substances such as paper, textile fabrics, wooden veneers, filter plates and the like a great number of pores and to provide means by which the distribution and the size of said pores can be controlled very precisely in order to increase the permeability of such materials in regard to liquids and gases, or to make practically impermeable materials such as for instance parchment paper permeable. This process is not applicable to glass, Celluloid and similar materials having an absolutely dense structure. India rubber may be treated by my process if it is at least slightly porous, for instance owing to insertions or embeddings of other materials or if it is manufactured from latex.

By my process porous sheet material may be obtained for constructing filters of any description, for making partitions or separators for separating the electrode plates of accumulators or storage batteries from one another and for many other purposes. For instance the commonly used wooden partitions for accumulators can be improved according to the invention to such a degree that the acid in the cells of the accumulator will more readily adopt a uniform density and the internal resistance is reduced, whereby the cells are enabled to supply currents of higher intensity, in particular at low temperatures. With filter papers and similar sheet materials the velocity of the passage or penetration of the fluid can be increased many times and it is possible to treat the porous sheet materials for adapting them very specially to the respective purpose for which they are to be used.

Moreover, by my novel process it is possible to manufacture filter sheets from materials which normally would not act as filters at all, for instance glued or parchment papers.

In case of materials which are already per se provided with fine pores, the spark discharges produced according to my process will pass uniformly through the micro-pores which are already present in the material and thus widen the size of said pores depending on the working conditions applied such as kind of current, intensity of current, voltage, and humidity of the material to be treated, by breaking away small particles from the walls of the existing pores. The size of said pores ranges from microscopic dimensions up to about 1 mm.

By the process according to the invention, pores can be produced which are of much smaller dimensions than those which can be produced by mechanical processes and means, such as needles. Moreover, in the process according to the invention the structure of the material is not injured, whereas in the case of mechanical perforation the structure is changed by the displacement of material at the points of perforation. Since the sparks pierce the material and break away particles of it, the structure of the material is loosened, for instance the surface of filtering paper is roughened, its absorbing surface and capillary effect increased and consequently the efficiency of the filter is augmented.

In the practice of my invention the material to be perforated is passed along electrodes discharging sparks which can be controlled as to their periodicity and other conditions. According to the invention the discharge of the sparks may be controlled by means of special devices for generating sparks and/or by means of special electrodes.

The sparks may be generated, for example, in the following manner:

1. By means of high tension alternating current or inductor current, in which case the intensity of the current may be regulated by inserting resistances into the primary or secondary or both circuits. The resistances may be in the form of ohmic resistances or in the form of inductances (choking coils) or in the form of capacities (condensers).

2. By means of a high frequency current of high voltage produced from alternating or direct current similar to the method used with spark transmitters and Tesla transformers. The voltage and current intensity are regulated, in addition to the method of changing the primary generator voltage by adjusting the quenching spark gap, by changing the inductive coupling and the transmission ratio of the high frequency transformer, or more particularly by means of a shunt resistance.

3. By means of discharges from condensers charged with high tension alternating or direct current. The current intensity and consequently the diameter of the pores are regulated by changing the size and the connection of the condensers in the circuit, further also by means of resistances.

The spark generators according to 2 are particularly adapted to produce fine and finest pores, whereas the arrangements according to 3 are better suited to the production of larger pores and show the best effects.

Since the sparks are to be very numerous and uniform, it is preferable to employ alternating current of a high number of cycles, or to produce the required high frequency current from direct current by means of a rotary exciter spark gap with a high number of interruptions.

The mode of operation of the process according to the invention is described in the following and the arrangements and devices necessary for the performance of the process are illustrated in the drawing by way of example. In the drawing—

Fig. 1 is a diagram of connection for a spark generating plant with high tension H. F. alternating or induction current, Fig. 2 is a diagram of connection for a spark generating device in which the spark is generated by means of condenser discharges, Fig. 3 is another diagram of connection for a spark generating device operating with condenser discharges, Fig. 4 is a diagram of connection of a device producing sparks by means of direct current and a rotating spark gap, Fig. 5 is a diagrammatical illustration of a simple perforating device coupled to a spark generator device according to Figs. 1 to 4, Fig. 6 is another embodiment of the perforating arrangement, in which rotary electrodes are employed, Fig. 7 is another modification of the arrangement according to Fig. 6, Fig. 8 is a cross-section through a device for guiding a plurality of sheets to be perforated simultaneously, Fig. 9 is a diagrammatical view of a further modification of the perforating device, Fig. 10 is a representation of an adjustable resistance which is free from induction and capacity, to be used at high tension.

Like characters denote like parts in the drawing, as far as possible.

In Fig. 1 character 1 denotes a transformer, 2 is a "quenching spark gap", i. e. a spark gap provided with means for quenching or blowing out the spark immediately after it has been formed, so as to obtain very short and intensive discharges without a substantial ionization of the spark gap, such spark gaps being known from the early stages of wireless telegraphy for the purpose of producing oscillations of a predetermined frequency in an antenna system. Various means are known in the wireless art for producing such "quenched sparks", therefore it will not be necessary to go into the details of such spark gaps; 3 and 3a are condensers; 4 is a Tesla transformer; 5 a shunt resistance for regulating the intensity of voltage of the current, respectively; 6 is an ammeter. Connected to terminals 7 is the perforating device. In place of the transformers 1 and 4 an inductor may be provided alternatively. A resistance, for instance a gas discharge tube may be inserted into the line leading to the perforating apparatus. High frequency current of a frequency of not less than $10^5$ c. p. s. is preferably employed, on account of the absence of danger assured thereby.

In order to produce as many perforations per second as possible, a high number of sparks is preferably used. Since it is not necessary to use a very high voltage of the high frequency current, the Tesla transformer may have a close coupling and possibly a very finely subdivided iron core in order to obtain the highest possible energy output. With the circuit shown in Fig. 4 the number of sparks can be regulated at will by charging the condenser 8 with direct current of for instance 5000 volts and by employing a rotating exciter spark gap 9.

The current intensity and consequently the width of the pores is regulated in the generating plants according to Figs. 2 and 3 by changing the size and the type of connection of the condensers 10, which are charged with high voltage alternating or direct current. Besides, a resistance 5a may be inserted, or the supply leads may be made of resistance wire assuring thereby, on the one hand, an extension of the limits within which the size of the pores may be regulated and, on the other hand, a more rapid fading-out or damping of the high frequency oscillations.

In this manner currents of considerable intensity may be applied, so that pores are obtained which are in the order of the size of pores produced mechanically, while, of course, the pores produced by means of sparks are of an entirely different type than those produced mechanically.

The perforating machine itself consists of an arrangement for conveying the materials to be treated and of a device for making the sparks travel perpendicularly or obliquely to the direction in which the material is advanced. The movement of the sparks may be effected in several ways:

1. With the materials in a vertical position, by the lifting effect of the heated air after the manner of the horned lightning arrester;

2. With the materials in any and preferably in a horizontal position, by moving an electrode in relation to a fixed electrode.

The current to be applied must, of course, be of a nature so as not to produce large holes by burning.

The number of the single perforations per surface unit may be regulated by selecting a suitable velocity, at which the object to be perforated is made to travel through the spark gap. The spark is preferably moved perpendicularly to the direction in which the material to be perforated is moved. This may be effected by the air-heating effect in the manner of a horned lightning arrester (Fig. 5), or by moving one of the electrodes (Fig. 6). The sheet 11 is passed between the horns 13, 13' of the device (perpendicularly to the plane of the drawing) by means of an endless conveying rope or cable 12. It may, however, also be moved below a moving electrode 14 consisting of a star, the points or teeth of which are spaced from one another by the length of the counter electrode 14', by means of conveyor bands 15 (Fig. 6). If the electrode is moved in this way, the perforating sparks are shorter in the middle than at the sides. Owing to the current intensity thus increasing towards the middle, the diameters of the pores will be larger in the middle than at the sides, which is a desirable condition for accumulator partitions or separators. If a uniform perforation is desired, the movement of the sparks may be effected, for instance, by means of an endless chain, which is provided with pointed projections spaced from one another by the width of the object to be perforated or by the length of the fixed electrode, respectively. The passage of the sparks may be facilitated by means of ultraviolet rays.

If it is required, when employing the star electrode, to assure that the sparks at the ends of the fixed electrode are not of greater length than in the middle, a plurality of conductive pins 16, 16', insulated from one another, may be arranged between star 14 and sheet 11, as shown in Fig. 7.

In this case the guiding device 17 is of a form adapted to the circular path of movement of the star electrode. A rectangular portion has been cut out in the middle section of device 17 of a width corresponding to the available length of the sparks. In this way the sparks are all made of a uniform length. Into this space a plurality of spacing or separating plates 18 made of insulating material are placed, which are provided in the middle with slots of some millimeters in width. Through the slots between the partitions the sheets to be perforated, that is paper band, textile fabrics, accumulator partition plates, etc., are guided. The separating plates 18 are preferably provided with fine flutes or corrugations, so that the spark gap may not be closed off too tightly.

In Fig. 8 is shown a diagrammatical cross-section through another modification of a perforating device according to Fig. 7.

In this modification the required power is still further reduced as compared to the device described with reference to Fig. 7 and at the same time the possibility is provided of guiding the objects to be perforated at greater distances from one another.

In this case the wires 16 are again embedded in the guiding device, and in addition narrow slots 19 have been cut-in for receiving the sheets to be treated so that the spark is sub-divided between the single layers by means of the small wire pieces 16'' remaining in the intermediate layers between the slots 19. Provision should be made that the spacing between the wires is as uniform as possible, and that a highly efficient insulation is used.

In Fig. 9 a movement of the sparks and a mode of subdividing them is illustrated which permits very wide spacing between the guiding slots and consequently between the sheets to be treated. A plurality of metal strips 20, 20', 20'' which may be provided with fine teeth or pointed projections and serve as fixed electrodes, are arranged parallel to each other and insulated from one another. The outside strips 20 and 20'' are connected to the poles of the high voltage supply. Between them are running, driven by a common shaft, belts or bands of insulating material 21, 21', to which are attached metal pins 22, 22', 23, 23' at distances corresponding to the length of the metal strips 20. The sparks are carried along by these pins at an absolutely uniform rate. They will be discharged at the points where a metal pin reduces the path through the air between the electrodes. The pins 22, 23, etc., are at least of a length equal to the width of the tapes 21, 21'. By means of suitable guiding devices or slots the sheets to be perforated move through the slots between the metal strips 20 and the tapes 21. In a similar way as shown in Fig. 8, it is also possible to provide a plurality of guiding slots in each interstice between one of the metal strips 20, 20', 20'' and the belts 21, 21' for receiving a plurality of sheets to be treated, so that every spark perforates several layers. It will be understood that one spark each moves at both sides of every band 21, 21' in the arrangement according to Fig. 9.

The arrangement according to Fig. 9 is particularly useful if a plurality of layers of the material are to be perforated simultaneously. The sheets or bands to be perforated are moved perpendicularly to the plane of the drawing through the slots between the electrodes and the moving belts, for which purpose suitable means of conveyance, such as double rollers or similar devices are provided (not shown).

The devices and arrangements described may, of course, be used not only in the positions illustrated, but also in any other suitable and useful positions.

The shape of the electrodes is of no material importance. In case the fixed electrodes consist of combs with pointed projections or saw-like toothed strips, a somewhat lower voltage is necessary than in case of smooth strips. The fixed electrodes may be provided with cooling surfaces. When producing comparatively wide pores by means of condenser discharges, such cooling surfaces are necessary, and the developed dust should be removed by means of a suitable exhaust fan.

The degree of humidity or moisture of the sheets to be treated is of a considerable influence to the resulting perforations and accordingly the results obtained as to the size and number of the holes and the general loosening of the structure of the sheet to be treated can be changed by changing the degree of moisture of the sheets. Also I have found that the kind of fluid in which the spark discharge is effected, may have an influence to the resulting product. Thus, by choosing the pressure and moisture of the air, vapour or gas surrounding the spark gap, I can control the action of the sparks. Inert gases like nitrogen may be admixed to the air for this purpose or the air may be blown against the spark gap so as to obtain special effects.

As mentioned above, the intensity of the current and thus the width of the pores may be regulated by means of resistances. In case the current intensity is comparatively high, a small resistance is sufficient for this purpose, for instance a straight wire possessing very low self-induction. In case finer pores are to be produced and the width of the pores is to be controlled or regulated during the perforating process, resistances of up to several hundred ohms may be used, having a considerable voltage drop between their extreme ends. However, by cutting-in and changing the resistance, the self-induction of the entire conductor system must not or at least not materially be changed.

In order to meet this requirement, the invention comprises in a special modification of the process a particular construction of a resistance, i. e. a resistance which is free from inductance and capacity and adapted for high voltages. Resistances required to be practically free from self-induction are usually made with bifilar or double wound winding This type of winding, however, is not applicable to higher voltages if the voltage difference amounts to several thousand volts, and moreover the capacity of such bifilar coils is too high.

According to the invention, the resistance wire is wound, beginning from the middle, in two opposite winding directions so that the magnetic fields of the two halves of the winding compensate or counter-balance and nullify each other.

In Fig. 10 is shown an adjustable resistance designed according to this principle.

The two halves 24 and 24' of the coil former are wound in accurate symmetry in two opposite directions preferably so that the cross-sectional area of the wire increases towards the middle. The sliding rod 25 is interrupted in the middle by the insulating piece 26; the rod carries the two sliding contacts 27 and 27'. The contacts are moved by means of the threaded spindle 28, at the end of which is attached the hand wheel 29. The spindle is made of insulating material and provided with a left hand thread at the one half and with a right hand thread at the other half. The upper ends of the sliding contacts 27 and 27' have corresponding threaded bores or, in order to facilitate the assembly and adjustment, additional pieces with threaded bores are used being arranged rotatably in the sliding contacts and fixed after adjustment for instance by means of a laterally arranged worm screw. When turning the handwheel 29 the sliding contacts 27 and 27' are symmetrically moved towards the middle, so that in both halves of the coil an equal number of turns are cut-in. The current leads may be connected to the ends of sliding rod 25, for instance by means of terminal screws 30.

By means of the process according to the invention, its embodiments and the described resistance device the high frequency oscillations produced by the discharge of the condensers may be used to perform the desired effect in an easily controllable manner so that the required perforations may be easily produced in a short time and at low cost.

While I have herein shown and described certain preferred embodiments of my invention, I wish it to be understood that I do not confine myself to all the precise details herein set forth by way of illustration, as modification and variation may be made without departing from the spirit of the invention or exceeding the scope of the appended claims.

Having thus described my invention, what I claim is:—

1. In a process for producing fine perforations in microporous sheets, partition sheets for electric accumulators, filter plates, filter cloth, the steps which comprise passing simultaneously a plurality of superposed sheets to be perforated through a spark gap formed between two electrodes and changing the length of the spark gap as the sheets pass along the electrodes of the spark gap so as to provide a shorter spark gap for perforating the middle portions than for perforating the outer portions of said sheets, whereby the diameter of the pores is steadily increased towards the said middle portions.

2. In a process for producing fine perforations in microporous sheets, partition sheets for electric accumulators, filter plates, filter cloth, the step which comprises passing simultaneously a plurality of superposed sheets to be perforated through the spark gaps of a plurality of spark gaps formed in series between two electrodes and guiding the sparks in the interstices between said sheets.

3. In an apparatus for producing fine perforations in micro-porous objects by means of electric spark discharges, a fixed electrode member and a rotary star-shaped electrode member, said star-shaped electrode member having a plurality of spark tips successively forming a perforating spark gap with the fixed electrode member, and means for passing the sheets to be perforated through said spark gap.

4. In an apparatus for producing fine perforations in micro-porous sheets by means of electric spark discharges, means for generating high tension electric current, a pair of plates of insulating material mounted in spaced relation, a plurality of wires embedded in said plates, the wires of one plate being aligned with the wires of the other plate and forming a plurality of perforating spark gaps therewith, and means for passing sheets to be perforated between said plates.

5. In an apparatus for producing fine perforations in micro-porous sheets by means of electric spark discharges, means for generating high tension electric current, a pair of plates of insulating material mounted in spaced relation, a plurality of wires embedded in said plates, the wires of one plate being aligned with the wires of the other plate and forming a plurality of perforating spark gaps therewith, means for passing a plurality of superposed sheets to be perforated between said plates, and means for guiding the sparks in the interstices between the said superposed sheets.

6. In an apparatus for producing fine perforations in micro-porous sheets by means of electric spark discharges, means for generating high tension electric current, a pair of plates of insulating material mounted in spaced relation, a plurality of wires embedded in said plates, the wires of one plate being aligned with the wires of the other plate and forming a plurality of perforating spark gaps therewith, means for passing a plurality of superposed sheets to be perforated between said plates, and means for guiding the sparks in the interstices between the said superposed sheets by means of wire ends embedded in insulating material and arranged in line with the said electrodes.

7. In an apparatus for producing fine perforations in micro-porous sheets by means of electric spark discharges, means for generating high tension electric current, electrode members forming together at least one perforating spark gap, means for passing a plurality of superposed sheets to be perforated through said spark gap, and finely ribbed insulating sheets which are longitudinally slotted and arranged in the interstices between said superposed sheets the slots of said insulating sheets being positioned in said spark gap and in the same line as the spark gap.

8. In an apparatus for producing fine perforations in micro-porous sheets by means of electric spark discharges, means for generating high tension electric current, electrode members forming together at least one perforating spark gap, means for passing a plurality of superposed sheets to be perforated through said spark gap, and corrugated insulating sheets which are longitudinally slotted and arranged in the interstices between said superposed sheets the slots of said insulating sheets being positioned in said spark gap and in the same line as the spark gap.

9. In an apparatus for producing fine perforations in micro-porous sheets by means of electric spark discharges, means for generating high tension electric current, fixed electrode members forming together at least one perforating spark gap, means for passing a plurality of superposed sheets to be perforated through said spark gap, movable insulating strips and relatively spaced conductive portions attached to said movable insulating strips parallel to the direction of the spark discharge and means for moving said insulating strips with said conductive portions simultaneously with the passage of said sheets to be perforated between said fixed electrode members and said conductive portions.

FRITZ KÖNIG.